United States Patent [19]

Onishi et al.

[11] Patent Number: 5,063,964
[45] Date of Patent: Nov. 12, 1991

[54] PIPE COUPLING USED WITH AUTOMATIC CONNECTING AND DISCONNECTING DEVICE

[75] Inventors: Toshihiko Onishi, Kakogawa; Katsumi Tomioka, Kobe, both of Japan

[73] Assignee: Nippon Air Brake Kabushiki Kaisha, Kobe, Japan

[21] Appl. No.: 622,475

[22] Filed: Dec. 5, 1990

[30] Foreign Application Priority Data

Dec. 7, 1989 [JP] Japan .................................. 1-141687

[51] Int. Cl.⁵ .............................................. F16L 37/28
[52] U.S. Cl. ................................. 137/614.03; 137/614
[58] Field of Search ............................ 137/614.03, 614

[56] References Cited

U.S. PATENT DOCUMENTS

| | | | |
|---|---|---|---|
| 2,208,286 | 7/1940 | Berger | 137/614.03 |
| 2,254,997 | 9/1941 | Fisher | 137/614.03 |
| 2,304,390 | 12/1942 | Wolfram | 137/614.03 |
| 2,854,259 | 9/1958 | Clark | 137/614.03 |
| 3,285,283 | 11/1966 | Calvin | 137/614.03 |
| 4,903,730 | 2/1990 | Otsuki et al. | 137/614.03 |

FOREIGN PATENT DOCUMENTS 159921  11/1954  Australia ........................ 137/614.03

Primary Examiner—A. Michael Chambers
Attorney, Agent, or Firm—Morris Fidelman; Franklin D. Wolffe

[57] ABSTRACT

A pipe coupling consisting of male and female elements for connecting and disconnecting a hydraulic or pneumatic piping used for industrial machinery. Each coupling element includes a check valve therein which is actuated by connecting and disconnecting operation to automatically open the passageway of the coupling when it is connected and to automatically close it when it is disconnected.

The inventive pipe coupling is designed for use with a conventional automatic connecting and disconnecting device such as automatic coupling device for large scaled industrial machinery.

5 Claims, 3 Drawing Sheets

PIPE COUPLING USED WITH AUTOMATIC CONNECTING AND DISCONNECTING DEVICE

BACKGROUND OF THE INVENTION

This invention relates to a pipe coupling used with an automatic connecting and disconnecting device for hydraulic and pneumatic pipings for general industrial machinery, such as disclosed in Japanese patent publication gazette No. S51-41934.

U.S. Pat. No. 4,903,730 discloses a pipe coupling of this type as described below with reference to FIG. 1 of the accompanying drawings. This coupling comprises a first main body 2 fixed to a stationary face plate 1 and a second main body 4 fixed to a movable face plate 3. The first main body 2 is cylindrical in shape and has a joint mouth 5 in its front end face and a pipe joint at its rear end. The second main body 4 has a front end portion having an outer diameter fitting in the joint mouth 5 and includes a second valve hole 8 in its front end face 7 and a pipe joint 9 at its rear end. The first and second main bodies 2 and 4 have a common axis when they are fixed to the respective face plates 1 and 3 and the second main body 4 is adapted to move close to and apart from the first main body 2 along the axis with movement of the movable face plate 3. The first main body 2 encloses therein a valve seat 10 freely sliding along the same axis.

The valve seat 10 is urged by a first spring 12 toward the joint mouth 5 and has an annular projection at its rear end which butts against an annular step 13 of the first main body 2. The valve seat 10 has a circular hole 35 formed in its front end face and a tubular third check valve 31 is slidably and fluid-tightly fit in this hole 35. The inner hole of the third check valve 31 constitutes a first valve hole 11 and a valve seat 36 is formed near its front end and adapted to be closed by a first check valve 14 which is fixedly supported by a central connecting rod 18 fixed to the first main body 2. The third check valve 31 is urged forward by a spring 40 disposed between an annular projection 37 formed on its outer surface and a spring seat 39 fit in an inner hole 38 of the valve seat 10 to close a gap between the valve seat 10 urged by the first spring 12 into its advance position and the first check valve 14 in its original position. Numeral 41 denotes a holding ring fitting in the inner hole 38 of the valve seat 10 and butting against the spring seat 39. It has through holes 42 and a central hole in which the connecting rod 18 fits slidably.

The second main body 4 includes therein a second check valve 20 of a greater diameter than the first check valve 14, which is adapted to be pushed by a second spring 19 to close the second valve hole 8 from its inside. An annular sealing member 21 is disposed on the front face of the valve seat 10 to face the front end face of the second main body 4. The sealing member 21 is adapted to enclose the first and second valve holes 11 and 8 when the front end face 7 of the second main body 4 butts against the front face of the valve seat 10 into a connected state of the coupling.

The reason why the third check valve 31 is disposed between the valve seat 10 and the first check valve 14 in the abovementioned structure of the first main body 2 is that it is practically impossible to put the valve seat 10 in contact with both the annular step 13 and the first check valve 14 at the same time and, if only the valve seat 10 contacts the first check valve 14, this check valve structure may be broken by a high fluid pressure acting to the valve seat 10, while the fluid pressure acting on the third check valve 31 is much lower due to its small cross sectional area.

However, the abovementioned prior art pipe coupling has such a disadvantage in that its size is unnecessarily large due to addition of the third check valve 31 when the coupling is used at a relatively low flow rate, since it is preferable to reduce the outer diameter of the coupling to make its overall size as small as possible.

SUMMARY OF THE INVENTION

Accordingly, an object of this invention is to provide an improved pipe coupling modified from the abovementioned pipe coupling, wherein the third check valve 31 is removed to reduce the overall size and, in order to reduce the resultant fluid pressure acting to the valve seat 10 and correspondingly reduce the force applied to the first check valve 14 and the connecting rod 18, the effective pressure receiving area of the valve seat 10 is reduced.

This object can be attained in accordance with this invention which provides a pipe coupling of the abovementioned type which is provided with a first main body having a joint mouth, a second main body fitting in the joint mouth of the first main body, a valve seat having a first valve hole, a first check valve for closing the first valve hole, a second check valve for closing the second valve hole, and an annular sealing member disposed on the front end face of the first or second main body, which are substantially same in structure as those components of the abovementioned prior art pipe coupling, and characterized in that the first main body has an inner hole connecting with the joint mouth thereof, the inner hole of the first main body is separated by a step into a first portion connecting with the joint mouth and a second portion having an inner diameter less than that of the first portion, the outer surface of the valve seat is separated by a step into a front end portion and a reat portion slidably fitting in the first and second portions of the inner hole of the first main body, respectively, through respective sealing rings, the inner diameter of the second portion of the inner hole is determined equal or a little greater than the inner diameter of the sealing circle provided by the annular sealing member, and the inner diameter of the sealing circle is determined close to the inner diameter of the first valve hole.

The invention will be described in more detail below in conjunction with a preferred embodiment with reference to the accompanying drawings.

BRIEF DESCRIPTION OF THE DRAWINGS

In the drawings.

Throughout the drawings, same reference numerals are given to corresponding structural components.

DESCRIPTION OF THE PREFERRED EMBODIMENT

Figure 1:
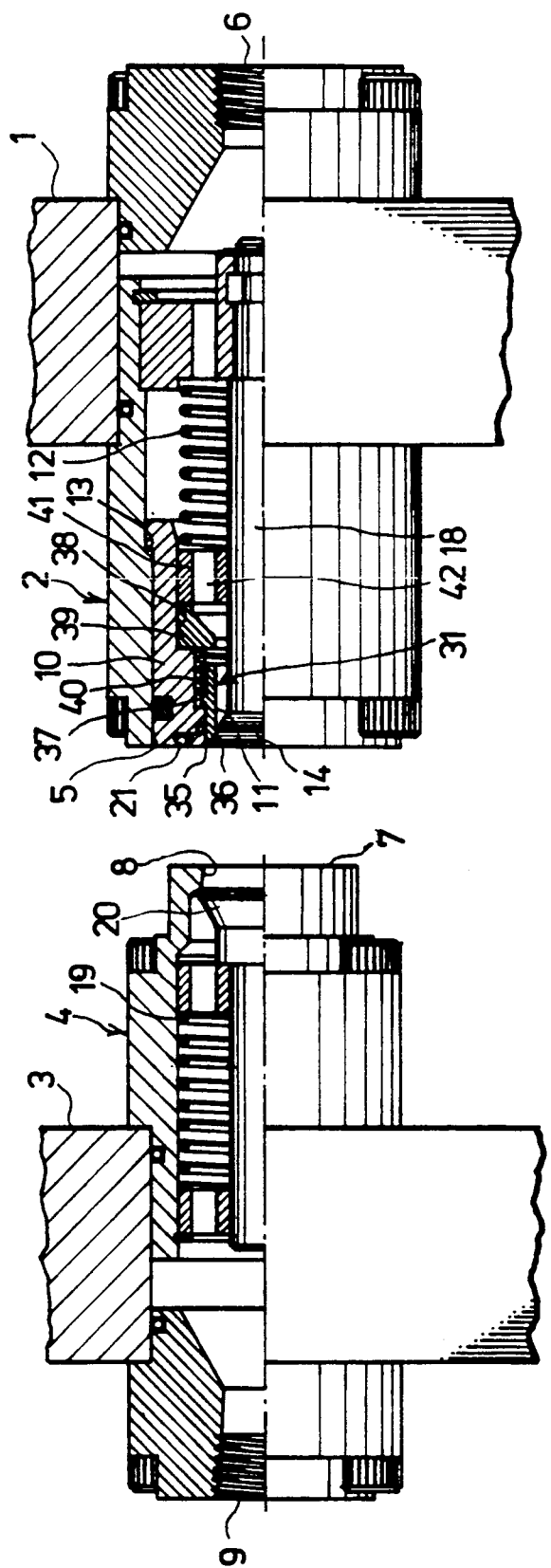
FIG. 1 is a partially sectional side view representing an example of the prior art pipe coupling in its disconnected state.
Figure 2:
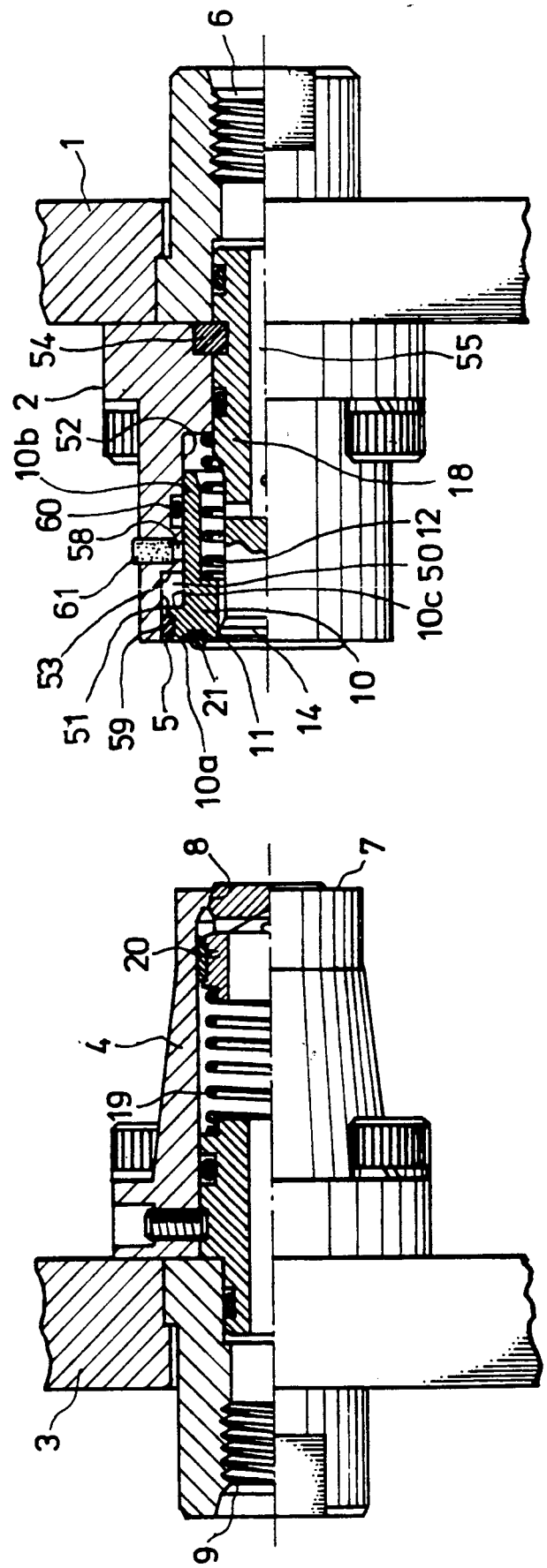
FIG. 2 is a partially sectional side view representing an embodiment of the pipe coupling according to this invention, which is in its disconnected state.

Referring to FIGS. 1 and 2, the pipe coupling of this embodiment is composed of a first main body 2 fixed to a stationary face plate 1 and a second main body 4 fixed to a movable face plate 3.

The first main body 2 has a joint mouth 5 in its front end face and an inner hole 50 which is separated into first and second portions 51 and 52 by a step 53. The first portion 51 has an inner diameter equal to that of the joint mouth 5, while the second portion 52 has an inner diameter substantially less than that of the first portion 51. A tubular valve seat 10 is slidably inserted in the inner hole 50 of the first main body 2 and the outer surface of the valve seat 10 is separated into a front end portion 10a and a rear guide portion 10i b by a step 10c. The front end portion 10a and the rear guide portion 10b respectively fit in the first and second portions 51 and 52 of the inner hole 50 of the first main body 2 through respective sealing rings 59 and 60. The valve seat 10 is provided with a central hole 11 as the first valve hole and urged by a first spring 12 toward the joint mouth 5. An annular sealing member 21 is disposed on the front end face of the valve seat 10 and the inner diameter of the sealing member 21 is determined a little less than the outer diameter of the rear guide portion 10b of the valve seat 10 and the inner diameter of the second portion 52 of the inner hole 50. A first check valve 14 is disposed in the first valve hole 11 for closing it from the outside thereof and is fixed to a valve shaft 18 which is fixed to the first main body 2 by a key 54 and has a central passageway 55. The valve seat 10 urged by the first spring 12 is inhibited from coming out of the joint mouth 5 by the valve shaft 18 through the first check valve 14. The inner hole 50 of the first main body 2 has a margin cavity between the steps 10c and 53 which allows free forward and backward movement of the valve seat 10 and the cavity is connected to the external atmosphere through a ventilation hole 58 having a filter 61 for preventing invasion of dust and lint through the hole 58.

The second main body 4 is substantially same in structure as that of the abovementioned prior art pipe coupling. More particularly, it encloses therein a second check valve 20 having a greater diameter than the first check valve 14 and being urged by a second spring 19 to close a second valve hole 8 from its inside.

When the pipe coupling having the abovementioned structure is in its disconnected state as shown in FIG. 2, high fluid pressure retained in the first main body 2 acts to the valve seat 10 to urge it against the first check valve 14. Therefore, the valve seat 10 is urged against the first check valve 14 by a thrust force attributable to the fluid pressure and a spring force of the first spring 12. As is readily understood from comparison of FIGS. 1 and 2, the effective pressure receiving area of the valve seat 10 is significantly reduced in FIG. 2 by providing the step 10c between its front and reat portions 10a and 10b. This results in substantial reduction in the hydraulic thrust force acting to the first check valve 14 and the valve shaft 18.

Figure 3:
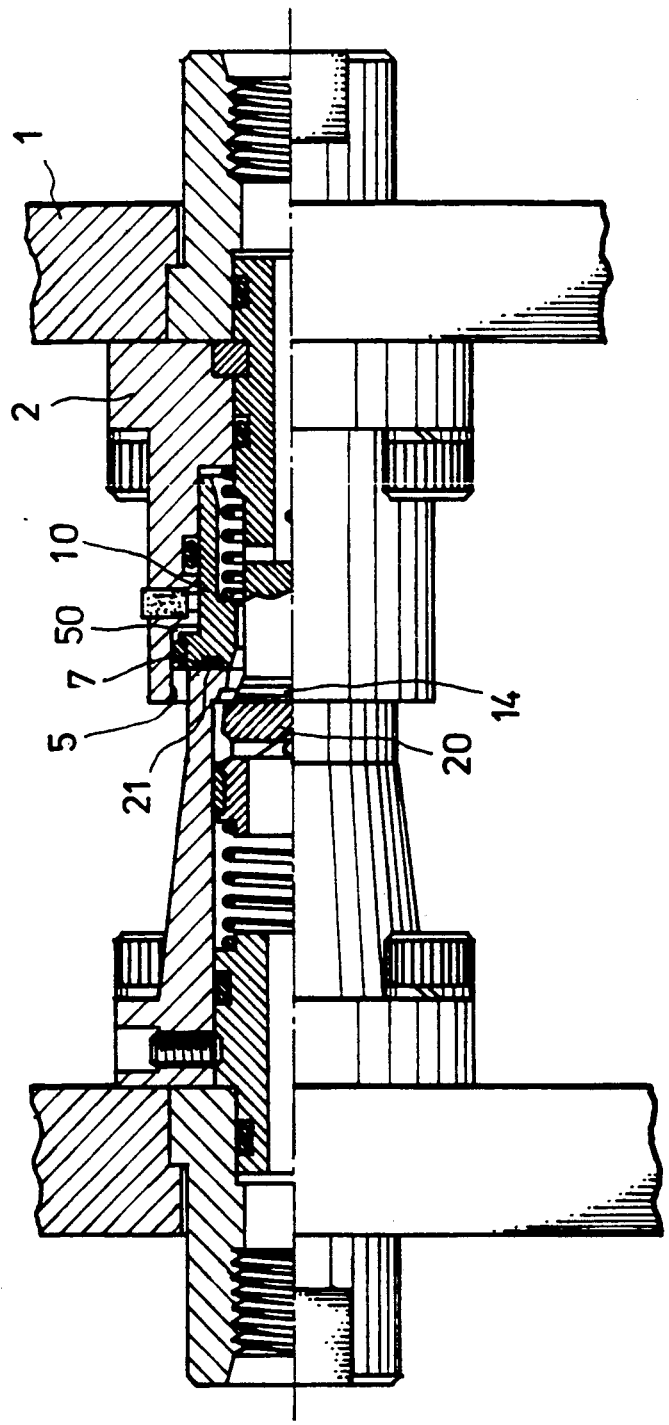
FIG. 3 is a partially sectional side view representing the embodiment of FIG. 2 in its connected state.

In the connected state of this pipe coupling as shown in FIG. 3, the valve seat 10 also receives the fluid pressure at part of its front face which is enclosed by the annular sealing member 21. While the thrust force attributable to this pressure urges the valve seat 10 backward, this backward thrust force is less than the abovementioned forward thrust force since the inner diameter of the sealing member 21 is designed to be a little less than the outer diameter of rear guide portion 10b of the valve seat 10. Consequently, the fluid pressure acting upon the valve seat 10 still produces a forward thrust force which serves to urge the annular sealing member 21 against the front face 7 of the second main body 4 to keep fluid-tightness therebetween.

What is claimed is:

1. A pipe coupling comprising a cylindrical first main body having a connection opening in a front end face thereof an inner hole connecting with said connection opening, a second main body having a front end portion of an outer diameter which can fit in said connection opening and a second valve hole in a front end face thereof, said first and second main bodies arranged to face each other on a common axis and adapted to allow mutual approaching and departing movement, a valve seat disposed in said first main body and urged toward said connection opening by a first spring, said valve seat having a first valve hole in a front end face thereof and being slidable along said axis, a first check valve of a small diameter adapted to close said first valve hole of said valve seat from the outside thereof, a second check valve of a larger diameter adapted to be urged by a spring to close said second valve hole from the inside thereof, and an annular sealing member disposed on one of the front end faces for forming an annular tight sealing zone when said first and second main bodies are in their connected state;

wherein said inner hole of said first main body is separated by a first step into a first portion connecting with said connection opening and a second portion having an inner diameter less than said first portion, and the outer surface of said valve seat is separated by a second step into a front end portion slidably fitting in said first portion of said inner hole and a rear portion slidably fitting in said second portion of said inner hole, so as to form an air cavity between said first and second steps, the outer diameter of said rear portion of said valve seat being greater than the inner diameter of said annular sealing zone.

2. A pipe coupling as set forth in claim 1, wherein the inner diameter of said annular sealing zone is close to the outer diameter of said rear portion of said valve seat.

3. A pipe coupling as set forth in claim 1, further comprising a dust sealing ring positioned adjacent the front end face between said front end portion of said valve seat and said first portion of said inner hole.

4. A pipe coupling as set forth in claim 3 wherein said dust sealing ring is air-permeable.

5. A pipe coupling as set forth in claim 1 further comprising a ventilation hole extending through said cylindrical main body connecting the external atmosphere to said air cavity and an air filter disposed in said ventilation hole.

* * * * *